United States Patent
Oberti et al.

(10) Patent No.: US 8,919,471 B2
(45) Date of Patent: Dec. 30, 2014

(54) COOLING DEVICE FOR AN AUTOMOTIVE VEHICLE

(75) Inventors: Claire Oberti, Paris (FR); Marco Marsilia, Boulogne Billancourt (FR); Samuel Cregut, Saint-Remy-les-Chevreuse (FR)

(73) Assignee: Renault S.A.S., Boulogne Billancourt (FR)

( * ) Notice: Subject to any disclaimer, the term of this patent is extended or adjusted under 35 U.S.C. 154(b) by 385 days.

(21) Appl. No.: 13/263,796

(22) PCT Filed: Apr. 9, 2010

(86) PCT No.: PCT/FR2010/050687
§ 371 (c)(1),
(2), (4) Date: Feb. 16, 2012

(87) PCT Pub. No.: WO2010/116104
PCT Pub. Date: Oct. 14, 2010

(65) Prior Publication Data
US 2012/0132394 A1  May 31, 2012

(30) Foreign Application Priority Data
Apr. 9, 2009 (FR) ...................................... 09 52362

(51) Int. Cl.
*B60K 11/02* (2006.01)
*B60K 1/00* (2006.01)
*F01P 7/16* (2006.01)

(52) U.S. Cl.
CPC . *B60K 11/02* (2013.01); *B60K 1/00* (2013.01); *F01P 7/167* (2013.01); *B60K 2001/003* (2013.01); *F01P 7/165* (2013.01); *F01P 2050/24* (2013.01)

USPC .......................................... 180/68.4; 180/68.5

(58) Field of Classification Search
USPC ................................................ 180/68.4, 68.5
See application file for complete search history.

(56) References Cited

U.S. PATENT DOCUMENTS

| | | | | |
|---|---|---|---|---|
| 3,540,540 A | * | 11/1970 | Schwab | 180/68.4 |
| 5,490,572 A | * | 2/1996 | Tajiri et al. | 180/65.1 |
| 5,549,153 A | * | 8/1996 | Baruschke et al. | 165/42 |
| 5,730,237 A | * | 3/1998 | Matsuki et al. | 180/65.1 |

(Continued)

FOREIGN PATENT DOCUMENTS

| | | |
|---|---|---|
| DE | 30 24 209 | 1/1981 |
| DE | 195 42 125 | 5/1996 |
| EP | 1 942 038 | 7/2008 |
| EP | 1 965 489 | 9/2008 |

OTHER PUBLICATIONS

International Search Report issued Aug. 3, 2010 in PCT/FR10/050687 filed Apr. 8, 2010.
U.S. Appl. No. 13/263,004, filed Oct. 5, 2011, Cregut, et al.

*Primary Examiner* — Jeffrey J Restifo
(74) *Attorney, Agent, or Firm* — Oblon, Spivak, McClelland, Maier & Neustadt, L.L.P.

(57) ABSTRACT

A cooling device for a motor vehicle, including a cooling circuit configured to cool an engine assembly using a liquid coolant circulated by at least one variable-flowrate pump, the flowrate of each pump being controlled by a control system. The control system is configured to control the flowrate of each pump in a closed-loop regulating system as a function of the temperature of the liquid coolant and of a setpoint temperature.

9 Claims, 2 Drawing Sheets

(56) References Cited

U.S. PATENT DOCUMENTS

| | | | |
|---|---|---|---|
| 6,450,275 B1 * | 9/2002 | Gabriel et al. | 180/65.23 |
| 6,540,036 B1 * | 4/2003 | Sugano | 180/68.1 |
| 6,662,761 B1 | 12/2003 | Melchior | |
| 6,745,726 B2 | 6/2004 | Joyce et al. | |
| 7,000,685 B2 | 2/2006 | Morishita et al. | |
| 7,284,594 B2 * | 10/2007 | Sanada et al. | 165/41 |
| 7,389,840 B2 * | 6/2008 | Makuta et al. | 180/65.31 |
| 7,823,671 B2 * | 11/2010 | Inoue et al. | 180/68.4 |
| 7,828,097 B2 * | 11/2010 | Kondou et al. | 180/68.1 |
| 8,047,318 B2 * | 11/2011 | Zhu et al. | 180/68.2 |
| 8,104,435 B2 * | 1/2012 | Schwartz et al. | 123/41.12 |
| 8,459,388 B2 * | 6/2013 | Kim | 180/68.4 |
| 8,459,389 B2 * | 6/2013 | Myers et al. | 180/68.4 |
| 8,479,855 B2 * | 7/2013 | Kim et al. | 180/68.3 |
| 8,494,698 B2 * | 7/2013 | Murata et al. | 701/22 |
| 8,499,869 B2 * | 8/2013 | Cimatti et al. | 180/68.1 |
| 2002/0073726 A1 * | 6/2002 | Hasebe et al. | 62/323.1 |
| 2003/0056404 A1 * | 3/2003 | Iwasa et al. | 37/347 |
| 2005/0274507 A1 * | 12/2005 | Sanada et al. | 165/202 |
| 2006/0169507 A1 * | 8/2006 | Inoue et al. | 180/68.4 |
| 2008/0060589 A1 | 3/2008 | Carney et al. | |
| 2008/0223319 A1 * | 9/2008 | Nakashima et al. | 123/41.66 |
| 2009/0139686 A1 | 6/2009 | Suzuki | |
| 2009/0139781 A1 * | 6/2009 | Straubel | 180/65.1 |
| 2009/0183936 A1 * | 7/2009 | Kim et al. | 180/68.4 |
| 2009/0289583 A1 | 11/2009 | Yoshida | |
| 2010/0025136 A1 * | 2/2010 | Matsushita et al. | 180/68.3 |
| 2010/0116458 A1 * | 5/2010 | Kim | 165/41 |
| 2010/0121508 A1 * | 5/2010 | Murata et al. | 701/22 |

* cited by examiner

COOLING DEVICE FOR AN AUTOMOTIVE VEHICLE

BACKGROUND

The subject of the invention is a cooling device for an automotive vehicle, comprising a cooling circuit capable of cooling an engine assembly using a coolant circulated by at least one variable flow rate pump. The invention applies advantageously to electric automotive vehicles.

In an internal combustion engine, the repeated combustions overheat the parts that are in contact, such as, for example, the pistons, the cylinders, and the valves, and are transmitted to all the mechanical parts of the engine. It is therefore necessary to cool them otherwise there is a risk of destruction. For correct operation, explosion engines thus need an even and suitable temperature.

In the case of a vehicle with electrical propulsion, it is also necessary to cool the various elements of the drive system.

It is known practice to use a cooling system comprising one or more pumps for circulating a coolant through the engine, and a radiator, which is a heat exchanger used to cool the liquid. In this case, the coolant flow rate is dependent on the engine speed, and is in particular zero when the engine is stopped.

It seems desirable to have a cooling device that makes it possible to optimize the operation of the pumps, and in particular to limit their wear and their energy consumption.

BRIEF SUMMARY

The device according to the invention makes it possible to achieve this objective.

The subject of the invention is thus a cooling device for an automotive vehicle, comprising a cooling circuit capable of cooling an engine assembly using a coolant circulated using at least one variable flow rate pump, the flow rate of each pump being controlled by a control system.

In the device according to the invention, the control system is able to servo-control the flow rate of each pump in a closed-loop regulation system according to the temperature of the coolant and a setpoint temperature.

Thus, the servo-controlling of the flow rate of each pump in closed loop mode makes it possible to limit its wear and its energy consumption.

The setpoint temperature may be predetermined according to the temperature outside the vehicle and the speed of the vehicle.

The automotive vehicle may be an electric vehicle and the engine assembly may include an electronic driver system.

The electric vehicle may include a battery charger assembly, and the cooling circuit is advantageously capable of cooling the charger assembly and the engine assembly.

In this case, the device may include a first pump capable of selectively supplying coolant to the engine assembly and a second pump capable of selectively supplying coolant to the charger assembly.

To this end, the device may include a first valve capable of preventing a flow of coolant in the charger assembly and a second valve capable of preventing a flow of coolant in the engine assembly.

The device may also include a hydraulic restriction for maintaining a minimum flow rate of coolant in the engine assembly.

The closed-loop regulation system may include a corrector of proportional-integral type.

The corrector may include a saturation block capable of limiting the correction between a minimum value and a maximum value.

BRIEF DESCRIPTION OF THE DRAWINGS

Other features and advantages of the present invention will become more clearly apparent on reading the following description, given as an illustrative and non-limiting example, and with reference to the appended drawings in which.

DETAILED DESCRIPTION

Figure 1:
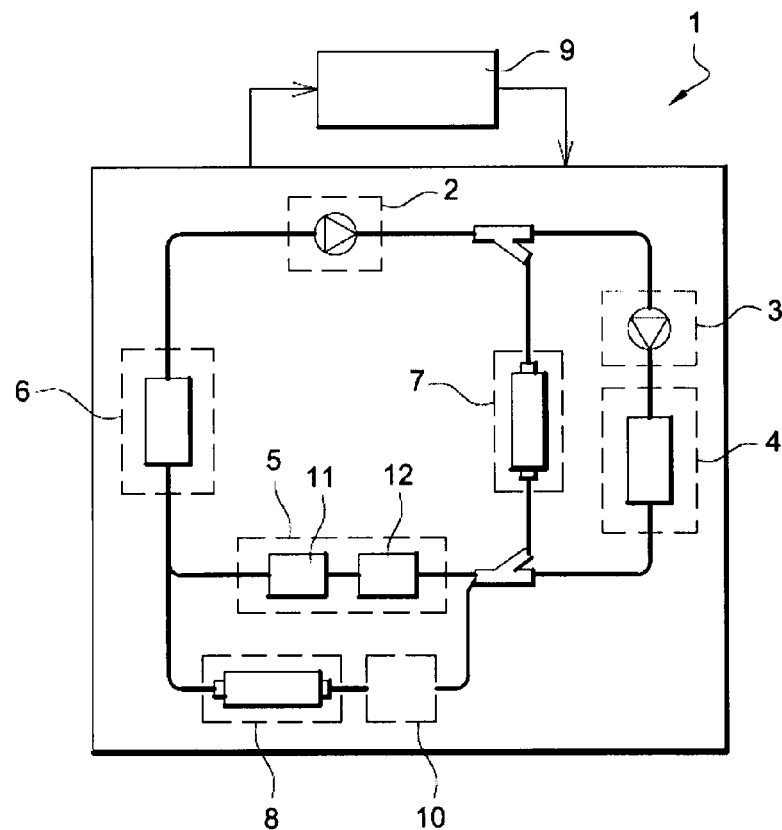
FIG. 1 illustrates, in block diagram form, a cooling device according to the invention, incorporated in an electric vehicle.

The cooling device 1, as illustrated in FIG. 1, comprises a first electric pump 2, a second electric pump 3, a battery charger 4, an engine assembly 5, a radiator 6, as well as a first solenoid valve 7 and a second solenoid valve 8. The first electric pump 2, the second electric pump 3, the first solenoid valve 7 and the second solenoid valve 8 are linked to a control device 9.

The first electric pump 2 is intended to be used when the vehicle is running, whereas the second electric pump 3 is intended to be used when recharging the battery. The flow rate of the first pump 2 and the flow rate of the second pump 3 can be set using a control signal.

The charger 4 is used, when the vehicle is stopped, to recharge the electric traction battery, not represented, from the domestic electric mains system.

The first solenoid valve 7 is used to short-circuit the second pump 3 and the charger 4, when the vehicle is running, whereas the second solenoid valve 8 is used to short-circuit the engine assembly 5 when recharging the battery, when it is estimated that the cooling of the engine assembly 5 is not necessary. The second solenoid valve 8 may be linked to a hydraulic restriction 10 which is used to produce a head loss and thus retain a flow rate of coolant in the engine assembly 5, even when the second solenoid valve 8 is in passing mode.

The engine assembly 5 comprises an engine 11 and an electronic driver system 12 intended in particular to convert the DC voltage from the battery into AC voltage.

The radiator 6 is used to cool the coolant, in a manner similar to the cooling device of an internal combustion engine. It is equipped with an electric fan, not represented.

The engine assembly 5 has to be cooled when the vehicle is running, as does the charger 4 when the vehicle is stopped. The cooling strategy is managed by the control device 9. The control device 9 is a computer which is linked with sensors of the cooling circuit, in particular coolant temperature sensors. The computer 9 drives the pumps 2, 3, the solenoid valves 7, 8, and the electric fan set of the radiator 6. The computer 9 is also advantageously linked to other computers of the vehicle, via a CAN (Controller Area Network) bus-type network for example, in order to obtain other measurements necessary to the cooling strategy.

Figure 2:
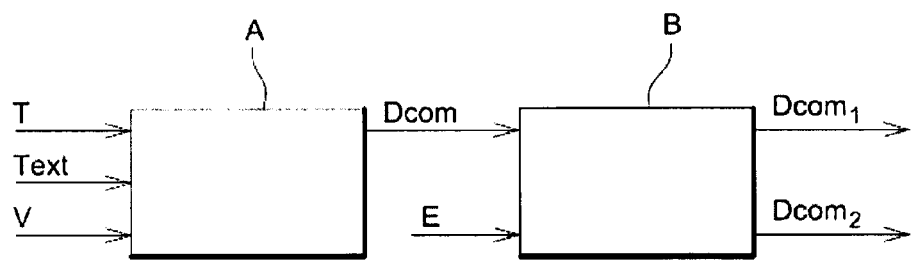
FIG. 2 illustrates, in block diagram form, a control strategy for the device.

The cooling circuit control strategy can be implemented in the form of two modules A, B, as illustrated in FIG. 2. The module A relates to the regulation of the temperature of the coolant, whereas the module B relates to the choice of electric pump 2, 3.

The module A is responsible for generating a coolant flow rate control according to the state of the vehicle (running or recharging the battery when stopped). The inputs of the module A are:

the temperature T of the coolant: this can be obtained using one or more temperature sensors, the temperature $T_{ext}$ outside the vehicle, and
the speed V of the vehicle.

The inputs of the module B are:
the flow rate control $D_{com}$ from the module A, and
the state E of the vehicle: this is a signal originating from the central computer of the car which has the value 1 if the vehicle is in battery recharging mode and has the value 0 if the vehicle is in running mode.

The outputs of the module B are:
the flow rate control $D_{com1}$ for the first pump, used in running mode. This is a signal between 0 and 100 and expressing the percentage of the maximum flow rate that can be produced by the pump, and
the flow rate control $D_{com2}$ of the second pump, used in recharging mode. This is a signal between 0 and 100 and expressing the percentage of the maximum flow rate that can be produced by the pump.

To put it simply, a choice can be made to use only the second pump if the vehicle state signal has the value 1 and to use only the first pump if the vehicle state signal has the value 0.

Figure 3:
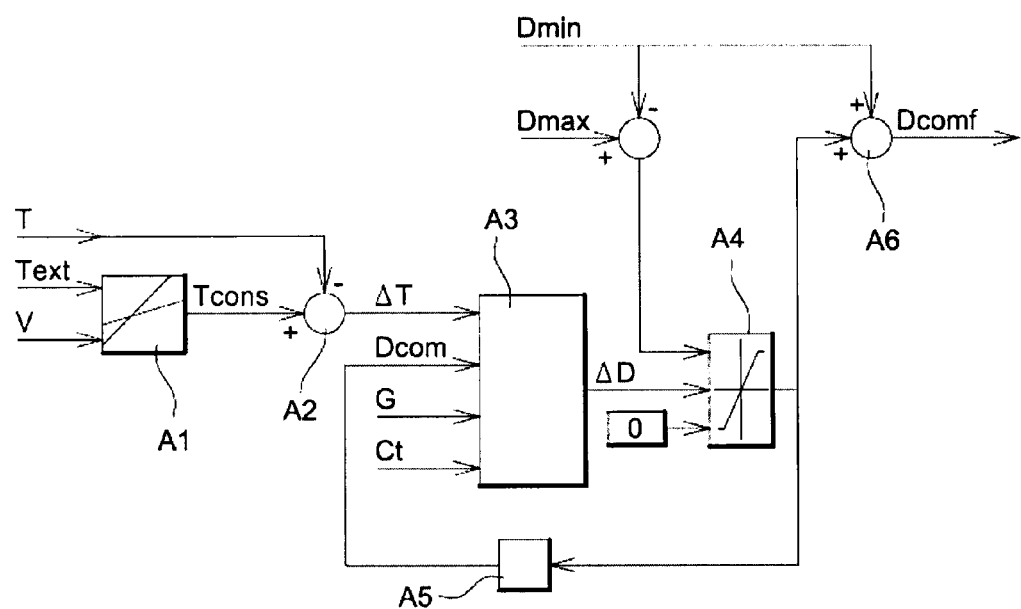
FIG. 3 is a detailed view of a block of FIG. 2.

One embodiment of the flow rate control is illustrated in detail in FIG. 3. The objective is to automatically vary the flow rate control between a minimum flow rate value $D_{min}$ and a maximum flow rate value $D_{max}$, according to the temperature of the coolant. As long as the temperature of the coolant is below a setpoint temperature, the flow rate control remains at the minimum value $D_{min}$. As soon as the temperature of the coolant exceeds the setpoint temperature, the flow rate control is obtained by closed-loop regulation, the setpoint concerned being the setpoint temperature, and the feedback loop concerned being the measured temperature of the coolant.

This objective is achieved by virtue of the blocks A1 to A6 of the module A.

The block A1 generates the temperature setpoint value $T_{cons}$ for the coolant according to the temperature $T_{ext}$ outside the vehicle and the speed V of the vehicle. In fact, the greater the speed V of the vehicle, the greater the capacity of the radiator to cool, and therefore, the more possible it is to increase the temperature setpoint value $T_{cons}$. Similarly, the colder the outside temperature $T_{ext}$, the more effective the radiator becomes and therefore the more possible it is to increase the temperature setpoint value $T_{cons}$. The block A1 thus produces the temperature setpoint value $T_{cons}$ by linear interpolation based on maps.

The block A2 then generates an error signal $\Delta T$ which is the difference between the setpoint temperature $T_{cons}$ and the measured temperature T. The signal $\Delta T$ is sent to the block A3 which is a corrector block PI (proportional-integral), well known to those skilled in the art. It would also, however, be possible to use a corrector of proportional type or a corrector of integral type.

The inputs of the block A3 are:
the error signal $\Delta T$ from the block A2,
the flow rate control $D_{com}$ sent at the preceding sampling instant; if the control is saturated at the value $D_{min}$ or at the value $D_{max}$, the corrector is informed thereof and the integral action is in turn also saturated,
the proportional gain G of the corrector PI, for example 1%,
the integral time constant $C_t$ of the corrector PI, for example 500 s.

The output of the block A3 corresponds to the desired increase $\Delta D$ in flow rate relative to the minimum flow rate $D_{min}$. This control should be saturated.

The block A4 produces this saturation, between 0 (no desired flow rate increase) and $D_{max}-D_{min}$. This saturated control is then stored by the delay block A5 which is used at the next sampling instant, to inform the corrector PI of any saturation.

Finally, the block A6 produces the final flow rate control $D_{comf}$. The final control $D_{comf}$ is computed by adding to the value $D_{min}$ the variation $\Delta D$ requested by the corrector PI.

The flow rate control is thus successfully made to change automatically between the two values $D_{min}$ and $D_{max}$. The value $D_{min}$ may, for example, be set to 30% of the maximum flow rate that can be produced by the pump. It is in fact shrewd practice to retain a non-zero minimum flow rate $D_{min}$ even if the temperature is low, to obtain a uniform temperature all along the circuit of the coolant and thus avoid the formation of hotspots. The value $D_{max}$ may be set to 80% of the maximum flow rate, for example if there is a desire not to over-stress the pump.

The coolant flow rate control strategy is thus particularly simple to implement on a computer. It demands little computation time and makes it possible to reduce electrical consumption.

Although the device described above has two pumps, the invention may also relate to a device that has one or more than two pumps. It may also be applied to a petrol engine equipped with electric water pumps.

The invention claimed is:

1. A cooling device for an automotive vehicle of electric type, comprising:
a cooling circuit configured to cool an engine assembly and a battery charger assembly of the vehicle using a coolant circulated using a first pump configured to selectively supply coolant to the engine assembly and a second pump configured to selectively supply coolant to the charger assembly;
a first valve arranged in parallel with the second pump and the battery charger assembly such that, when the first valve is closed, the coolant is supplied to the second pump and the battery charger assembly and, when the first valve is open, the coolant is not supplied to the second pump and the battery charger assembly;
a second valve arranged in parallel with the engine assembly such that, when the second valve is closed, the coolant is supplied to the first pump and the engine assembly; and
a control system configured to control a flow rate of the first pump and configured to control a flow rate of the second pump,
wherein the control system is configured to servo-control the flow rate of each pump in a closed-loop regulation system by comparing a temperature of the coolant and a setpoint temperature,
wherein, when the temperature of the coolant is below the setpoint temperature, the control system sets the flow rate of the first pump or the flow rate of the second pump to a minimum flow rate, and
wherein, when the temperature of the coolant is above the setpoint temperature, the control system increases the flow rate of the first pump or the flow rate of the second pump to decrease the temperature of the coolant until the temperature of the coolant is equal to the setpoint temperature.

2. The device as claimed in claim 1, wherein the setpoint temperature is variable and is predetermined according to a temperature outside the vehicle and speed of the vehicle.

3. The device as claimed in claim 1, wherein the automotive vehicle is an electric vehicle and the engine assembly includes an electronic driver system.

4. The device as claimed in claim 1, further comprising a hydraulic restriction for maintaining a minimum flow rate of coolant in the engine assembly when the second valve is open.

5. The device as claimed in claim 1, wherein the closed-loop regulation system includes a corrector of proportional-integral type.

6. The device as claimed in claim 5, wherein the corrector includes a saturation block configured to limit the correction between a minimum value and a maximum value.

7. The device as claimed in claim 1, wherein the minimum flow rate is a non-zero flow rate.

8. The device as claimed in claim 1, wherein, when the vehicle is in a running mode, only the first pump is used and, when the vehicle is in a battery recharging mode, only the second pump is used.

9. The device as claimed in claim 1, wherein the second pump is positioned immediately upstream of the charger assembly in the cooling circuit.

* * * * *